United States Patent
Heidl et al.

(10) Patent No.: US 7,373,261 B2
(45) Date of Patent: *May 13, 2008

(54) PORTABLE HYDRANT METER AND SYSTEM OF USE THEREOF

(76) Inventors: Jeremy N. Heidl, 1370 Smokehill Dr., Hoschton, GA (US) 30548; Donald S. McCroskey, 3345 Callie Still Rd., Lawrenceville, GA (US) 30045

( * ) Notice: Subject to any disclaimer, the term of this patent is extended or adjusted under 35 U.S.C. 154(b) by 0 days.

This patent is subject to a terminal disclaimer.

(21) Appl. No.: 11/463,251

(22) Filed: Aug. 8, 2006

(65) Prior Publication Data
US 2007/0005273 A1    Jan. 4, 2007

Related U.S. Application Data

(63) Continuation of application No. 11/113,707, filed on Apr. 25, 2005, now Pat. No. 7,099,781.

(51) Int. Cl.
*G01F 1/00* (2006.01)
*G01F 7/00* (2006.01)

(52) U.S. Cl. ........................................... 702/45

(58) Field of Classification Search ................... 702/45
See application file for complete search history.

(56) References Cited

U.S. PATENT DOCUMENTS

| 6,816,072 B2 | 11/2004 | Zoratti | ..................... 340/540 |
| 7,099,781 B1 * | 8/2006 | Heidl et al. | ................... 702/45 |

* cited by examiner

*Primary Examiner*—Michael Nghiem
(74) *Attorney, Agent, or Firm*—Needle & Rosenberg, P.C.

(57) ABSTRACT

The meter system having a portable water meter that is releaseably mountable onto a discharge nozzle of the fire hydrant and a flow sensor that senses the water flow rate passing therethrough the portable water meter. A processor receives, processes, and/or stores data from the flow sensor and a satellite positioning system. The hydrant meter system further has a communication device that is adapted to transmit the processed flow signal and the processed positioning signal to a remote server system via a communication medium. The hydrant meter system allows for automated water utility resource measurements, data collection and exercise of control and notification of fire hydrant water usage.

26 Claims, 4 Drawing Sheets

PORTABLE HYDRANT METER AND SYSTEM OF USE THEREOF

CROSS-REFERENCE TO RELATED APPLICATION

This application is a continuation of, and claims priority to and the benefit of U.S. patent application Ser. No. 11/113,707 now U.S. Pat. No. 7,099,781, entitled "Portable Hydrant Meter and System of Use Thereof," filed Apr. 25, 2005, which is incorporated in its entirety in this document by reference.

FIELD OF THE INVENTION

The present invention relates to meter reading and control, and more particularly to systems and methods for automated utility resource measurements, data collection and exercise of control and notification, and still more particularly to systems and methods for automated water utility resource measurements, data collection and exercise of control and notification of water hydrant water usage.

BACKGROUND ART

Utilities provide commodities such as electricity, gas and water to the public, preferably at the least possible cost to each consumer. However, each year utilities are subject to increasing costs due to distribution losses. While certain amounts of electricity, gas, water and other commodities are lost due to the technical limitations of the various distribution systems, large quantities of these commodities are stolen. These "non-technical distribution losses" are typically written off by the various utilities as unrecoverable due to a general lack of evidence available to prove energy theft. Unfortunately, such theft and losses have become an increasing problem for many utilities.

For water utilities, theft from fire hydrants for construction projects and the like is an increasing problem. Frequently, a discharge nozzle cap of a conventional fire hydrant is removed from the bonnet of the hydrant and a control valve is moved to the open position by a non-utility person to allow water flow from the fire hydrant. This theft poses a public health and welfare threat as the municipality's primary water source for the community can be reduced below safe levels. For example, an open flowing fire hydrant causes a significant decrease in the pressure of the water supply main. This results in an inability to fight fires within an entire section or loop part of the supply main grid as generally all of the nearby fire hydrants on that portion of the grid are rendered useless.

Automated meter reading for consumption rate of different utility resources such as water, gas or electricity has become more desirable compared to the methods using meters that require manual reading and recording of the consumption levels. One type of automated "local" means of collecting meter reading requires an operator to be in close physical proximity of the meter to obtain the meter reading, such as, for example by using touch read methodologies, and transporting the data to a central computer.

Another type of automated meter reading is based on collection of data by telephone lines or radio transmission. The meter reading, in both cases, may be collected through the phone lines connected to the meter, i.e., phone read, or communicated to a portable hand-held computer. The radio based meters, such as those provided in U.S. Pat. Nos. 4,652,877 and 4,782,341 issued to Gray and incorporated herein by reference, were more widely used since the reading could be collected as an operator drove by the meter (drive-by system), or in combination with the touch read system, be read manually. The radio read is particularly desirable in areas where the meter, specifically the water meter, is inside a pit at a distance from the building and away from a power source. However, in such systems, the antenna was disposed outside of the meter and was hardwired to the mechanical register through the meter housing so the signals passing from the register to the RF transmitter were not wireless.

In the noted methodologies, the collected data from each utility meter must be transported to a central computer and compiled for billing, statistical or any other services that the utility companies may provide to their customers. Each of the aforementioned automated meter reading techniques still requires a large amount of manpower and is susceptible to errors in entry and transportation of data. Moreover, the utility companies cannot exercise any control or provide notifications to their customers without using additional manpower, cost and potentially less reliable means of communication.

Conventionally, each utility meter is associated with a particular address to which utility companies associate the complied collected data from the particular utility meter. However, in the water utility market, fire hydrants are not associated with a specific billing address. Rather, they are spread about a water utilities supply grid in accordance with appropriate municipal code. Thus, stolen water from a fire hydrant is not typically captured and billed by conventional metering systems.

Typically, water utilities attempt to have using parties pay for the water that they use from the water supply grid by having the using party mount a portable fire hydrant meter onto the fire hydrant. Conventional portable fire hydrant meters operate on the basis of a mechanical odometer that identifies the consumption of the water consumed. These fire hydrant meters can use electronic reading of the odometer wheels. The odometer is typically read at the end of the job and the difference between the end-of-job reading and the initial reading determines the amount of utility water used. As one would expect, the user pays for the water used. The prior art fire hydrant meters provided no ability to restrict the amount of water consumed by the user. Further, they did not provide an ability to monitor the actual real-time consumption of water.

Consequently, a need exists for an improved system for automated water utility resource measurements, data collection and exercise of control and notification of water hydrant water usage.

SUMMARY

In one aspect of the present invention, a meter system for collecting and communicating flow data for water from a fire hydrant having a discharge nozzle is provided. The meter system can comprise a portable water meter that is releaseably mountable onto the discharge nozzle of the fire hydrant and a flow sensor to sense the water flow rate passing therethrough the portable water meter. In this aspect, the meter system can also comprise a processor configured to receive, process, and/or store data from the flow sensor and a satellite positioning system, operatively coupled to the processor, that is adapted to receive satellite position determining signals. The system further comprises a communication device that is operatively coupled to the processor and is adapted to transmit the processed flow signal and the processed positioning signal to a remote server system via a communication medium. The system allows for automated water utility resource measurements, data collection and exercise of control and notification of water hydrant water usage.

Some embodiments meter system of the present invention include one or more commodity meters (e.g., electrical energy meters, gas meters, water meters, portable fire hydrant meters and the like), one or more servers, and a communications device to communicate between the meter and the server.

Each meter is preferably connected to at least one of several servers via any suitable communication medium. In some embodiments, each meter is connected to a server via one of several different types of communication mediums, and the meters are able to communicate with the servers over each of the different types of communication mediums simultaneously. For example, one meter can be connected to a server via a cellular network, while another meter can be connected to the same or another server in the system via a satellite network. In some embodiments, two or more meters can communicate simultaneously with the same server over the same or different networks. The servers are generally located remotely from the meters, such as at a utility's facility a distance from the customer. The communications device is used to communicate remotely between the meters and the servers. The communications device preferably enables bi-directional communication in real time between the meters and the servers.

In another aspect, a meter system for a fire hydrant having a discharge nozzle comprises a portable meter apparatus that has a housing with a flow sensor that is in communication with a conduit defined therein the housing. A means for determining the geographic coordinate information of the housing is provided. Further, the portable meter apparatus further comprises a processor that is coupled to the flow rate sensor and the means for determining the geographic coordinate information. The portable meter apparatus further comprises a means for transmitting, which is coupled to the processor, the flow rate signal and the geographic coordinate location of the housing remotely from the housing.

DETAILED DESCRIPTION OF THE FIGURES

These and other features of the preferred embodiments of the invention will become more apparent in the following detailed description in which reference is made to the appended drawings wherein.

DETAILED DESCRIPTION OF THE INVENTION

Figure 1:
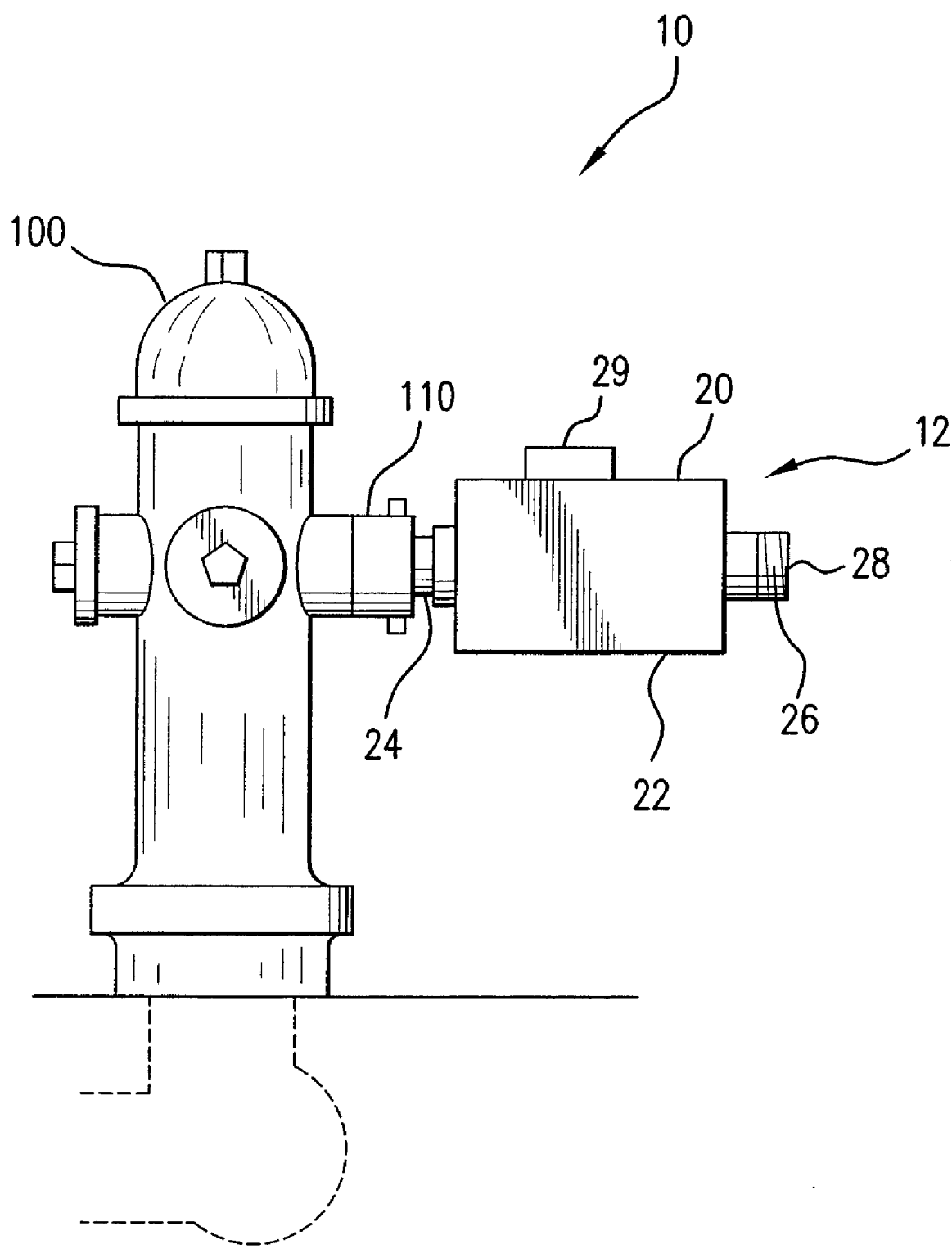
FIG. 1 is a side elevational view of a portable fire hydrant meter apparatus of the present invention mounted thereon a conventional fire hydrant.
Figure 2:
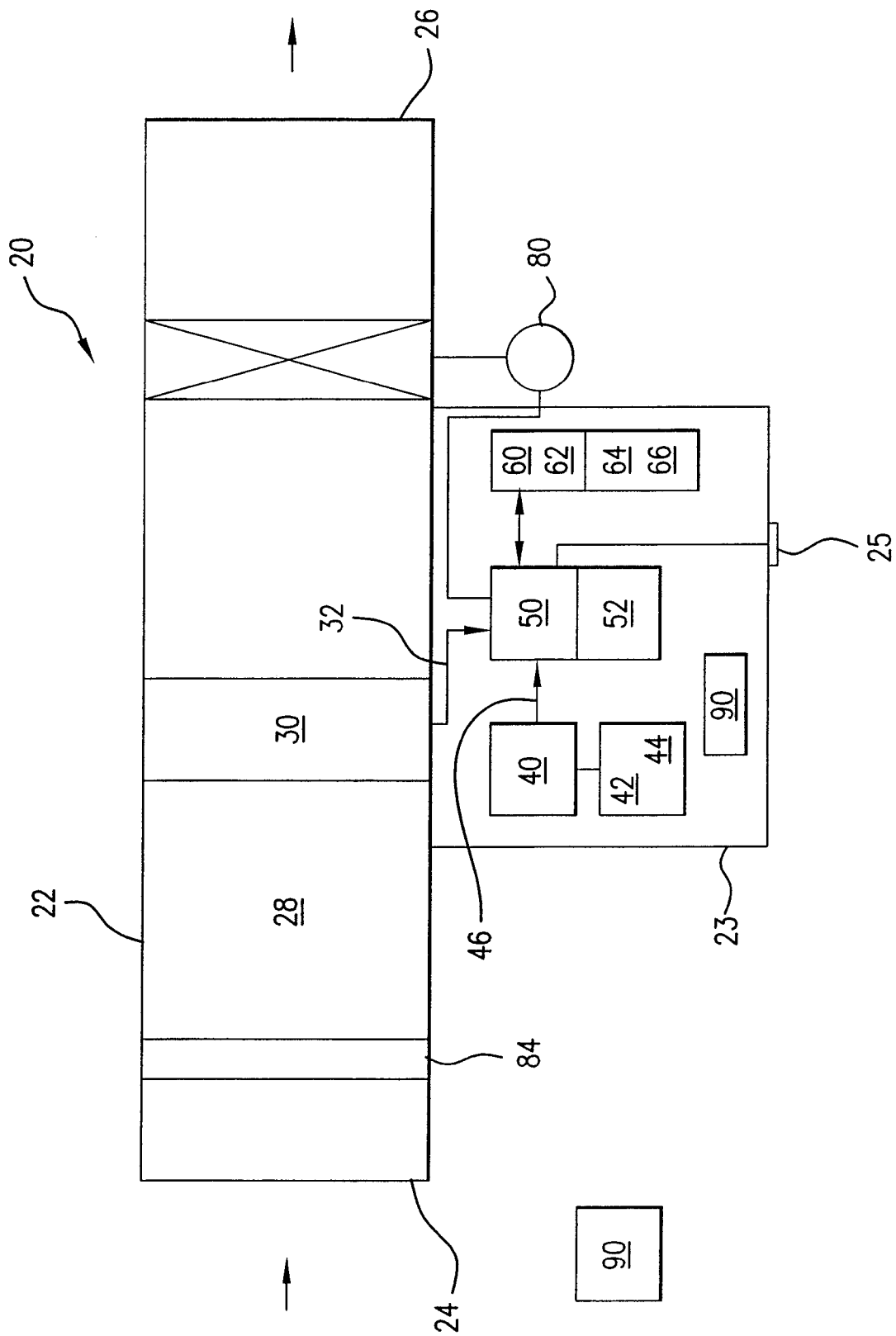
FIG. 2 is a schematic diagram of the portable fire hydrant meter apparatus of the present invention according to one embodiment of the present invention.
Figure 3:
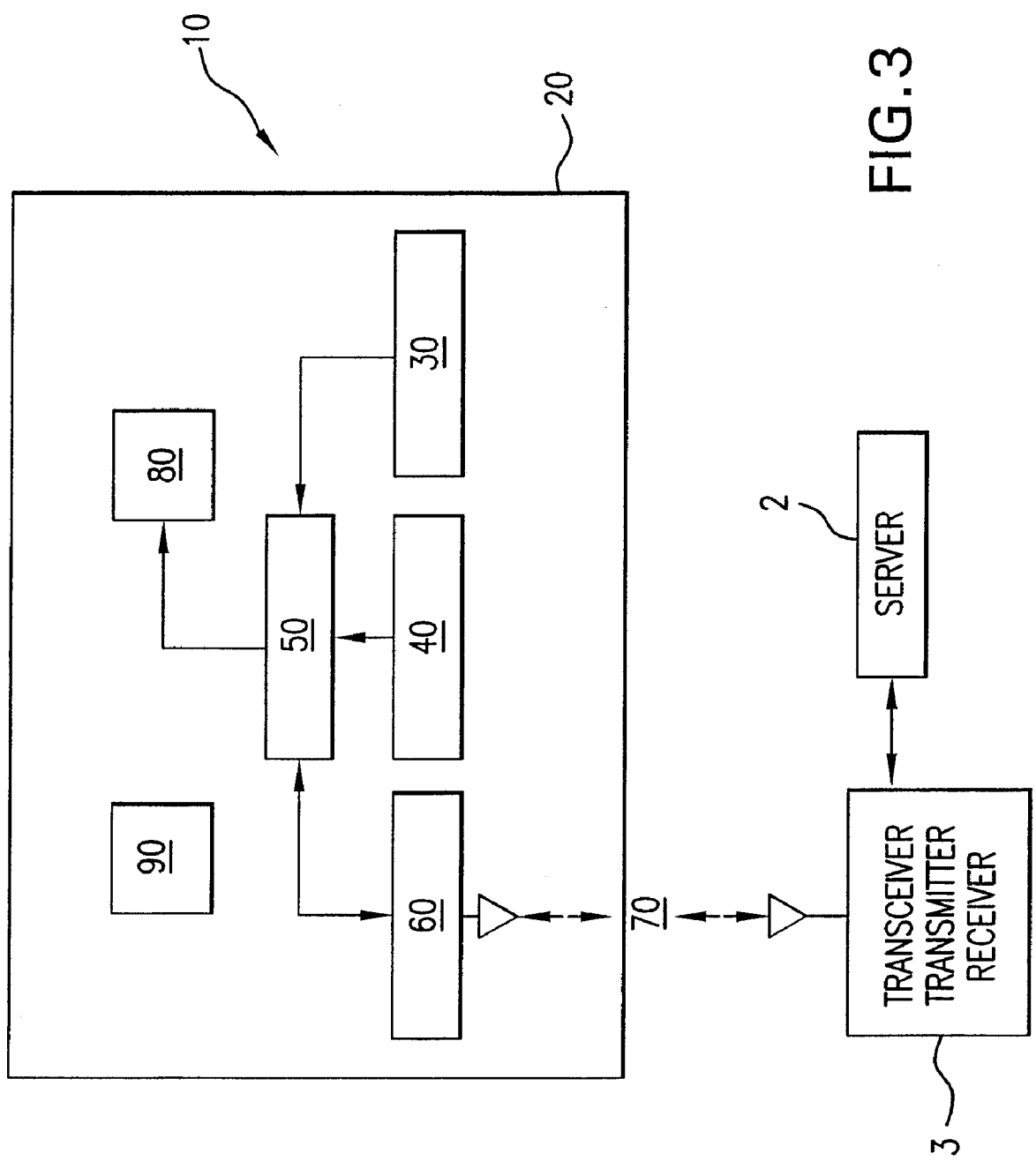
FIG. 3 is a schematic diagram of meter system configured to provide flow rate information and position determination information according to one embodiment of the present invention.
Figure 4:
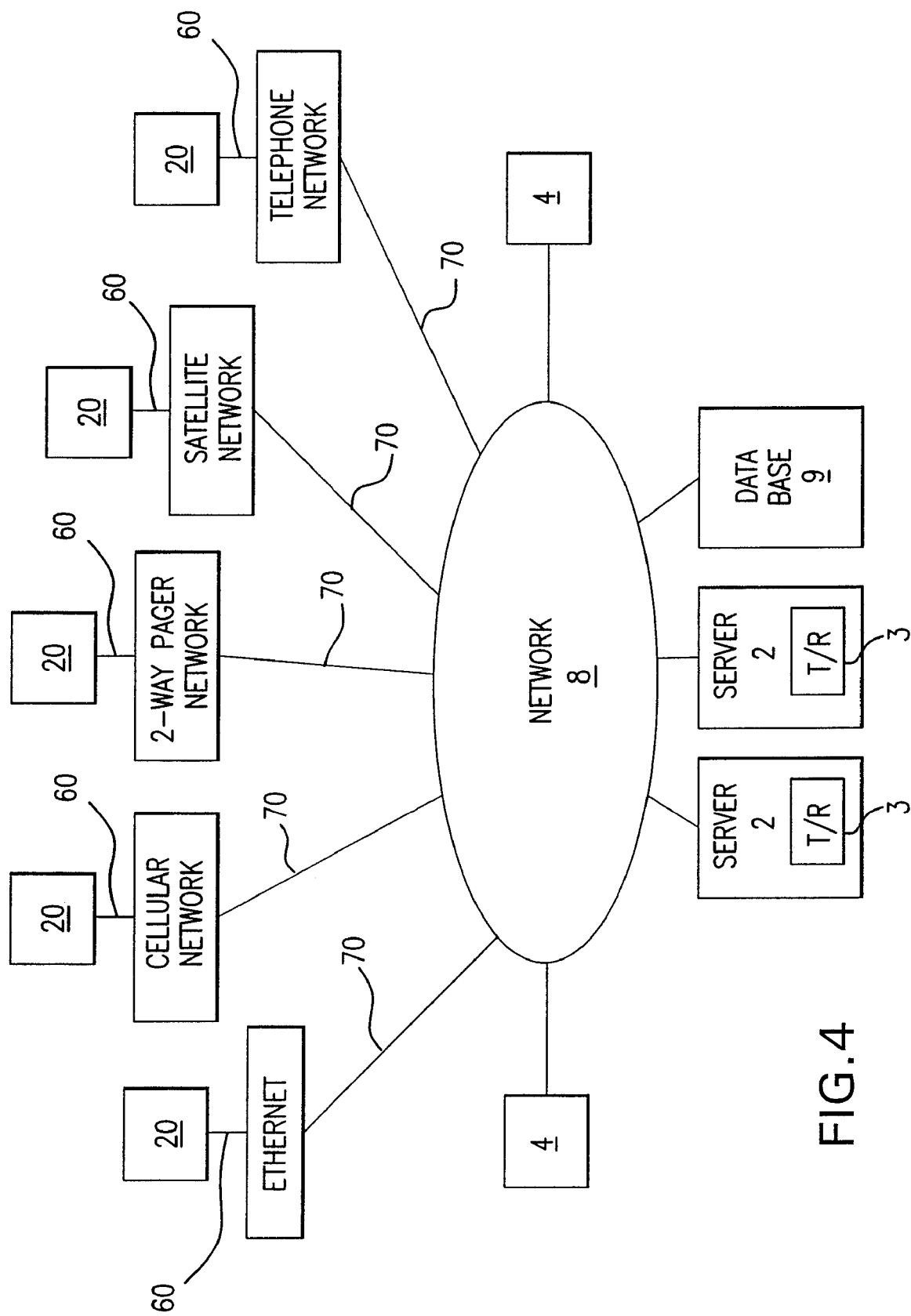
FIG. 4 is a schematic diagram showing an exemplary representation of the meter system of the present invention communicating with a remote server system in accordance with one embodiment of the present invention.

The present invention is more particularly described in the following examples that are intended as illustrative only since numerous modifications and variations therein will be apparent to those skilled in the art. Thus the embodiments of this invention described and illustrated herein are not intended to be exhaustive or to limit the invention to the precise form disclosed. They are chosen to describe or to best explain the principles of the invention and its application and practical use to thereby enable others skilled in the art to best utilize the invention. As used in the specification and in the claims, "a," "an," and "the" can mean one or more, depending upon the context in which it is used. The preferred embodiment is now described with reference to the figures, in which like numbers indicate like parts throughout the figures.

Referring to the figures, a meter system 10 embodying the present invention is illustrated. In one embodiment, the system 10 includes commodity meters connected to or otherwise associated with one or more buildings or properties such as homes, businesses, and industrial plants. Alternatively, the system includes commodity meters that are associated with particular geographic coordinates or with a particular device. The commodity meters can be any device capable of measuring a commodity (i.e., any economic good) being consumed, such as electricity, water, gas, steam, telephone service, oil, gasoline, and the like. In one preferred embodiment, described in more detail below, the commodity meter 12 is a portable water meter 20 that is constructed and arranged for being releasably mounted thereto a discharge nozzle 110 of a conventional fire hydrant 100.

In one embodiment, the meter system 10 collects and communicates flow data for water being discharged therethrough the discharge nozzle 110 of the fire hydrant. The portable water meter apparatus 20 can comprise a first housing 22 that is constructed and arranged to be connectionally and releasably mounted to the discharge nozzle of the fire hydrant. The first housing has an inlet end 24, an outlet end 26, and defines a conduit 28 extending therebetween the inlet and outlet ends. As one will appreciate, the inlet end 24 of the housing are constructed and arranged for connection to the conventional discharge nozzle 110 of the fire hydrant. The outlet end 26 is constructed and arranged for connection to the desired hose, line, piece of equipment, and the like as needed by the user.

The portable water meter apparatus 20 also comprises a flow sensor 30 in communication with the conduit 28, the flow sensor generating a flow signal 32 representative of a flow rate therethough the conduit of the housing. In one aspect, the flow sensor 30 can comprise a conventional magnetic rotation sensor to detect water flow therethrough the first housing such as the water meters distributed by Master Meter, 100 E. Street, Suite 350, Fort Worth, Tex., or BadgerMeter, Inc., P.O. Box 245036, Milwaukee, Wis. Conventionally, this exemplary the flow sensor comprises a transmission coupling, a measuring element insert and a rotor. In use, water flows into the conduit 28 of the first housing and flow reading are obtained by rotor revolutions that are transmitted by a direct magnetic drive coupling. Typically, the magnetic drive is achieved by a right angle worm drive that couples the rotors and a vertical transmission spindle. A ceramic magnet on the spindle rotates around the vertical axis. Thus, through the magnetic coupling, rotor rotation is transmitted to a follower magnet, which is indicative of the flow rate of water therethrough the conduit 28.

As one will appreciate, the portable water meter 20 can also comprise a straight-reading odometer-type totalization display 29 that is permanently sealed so that dirt, moisture, tampering and lens fogging problems are eliminated. In this aspect, the follower magnet of the magnetic coupling transmits rotation to the register gearing conventionally.

In one aspect, the magnetic rotation sensor provides a scaled digital pulse output that is indicative of the flow of mater through the conduit 28 of the first housing 20. Additional information regarding an exemplary flow sensor or meter register adapted for communication and its manner of operation can be found in U.S. Pat. No. 6,819,292, entitled "Meter Register," that issued on Nov. 16, 2004, the disclosure of which is incorporated herein in its entirety by reference.

In another aspect, the flow sensor can comprise an electromagnetic flow sensor, which is exemplified by the electromagnetic flow meters manufactured by IDEX Corporation, and distributed by Master Meter as Liquid Controls. In this aspect, the flow sensor comprises a lined flow tube, two electromagnetic coils and two diametrically opposed electrodes. The lined flow tube has an internal, insulating liner, such as and not meant to be limiting, PTEE (Teflon), polypropylene, ebonite (hard rubber) liners, and the like. The two electrodes are positioned opposite each other on the internal surface of the lined flow tube. The coils, which generate the magnetic field, are placed outside the flow tube.

This exemplary flow sensor bases it flow measurement on Faraday's Law of Electromagnetic Induction, which states that when a magnetic field is created at right angles to the flow tube through which a conductive fluid is flowing, the voltage induced in the electrodes that are immersed in the fluid is proportional to the velocity of the liquid. This induced voltage is converted to a scaled digital pulse output and, optionally, to a 0-20 mA analog output by a converter.

The portable water meter apparatus 20 also comprising a means for determining the geographical location of the portable water meter 20, which may comprise a satellite positioning system 40 that includes a receiver 42 adapted to receive satellite positioning signals. The satellite positioning system 40 can comprise a conventional GPS transceiver 44 that, when externally activated by a user, or a remoter server, or by an output of the flow sensor, assesses the GPS satellite network to determine the position of the portable water meter apparatus in latitude and longitude.

The portable water meter apparatus 20 further comprises a processor 50 that is configured to receive the flow signal 32 output of the flow sensor 30, process the flow signal for transmission, and store the processed flow signal in a data storage device 52. The processor can also be configured to receive the satellite positioning determining signals 46 output by the satellite positioning system 40, process the satellite position determining signals to adapt the satellite position determining signals for transmission, and store the processed positioning signal in the data storage device. In an alternative aspect, the satellite positioning system 40 can process the satellite position determining signals to adapt the satellite position determining signals for transmission and store the processed positioning signal in a data storage device within the satellite positioning system.

The meter system 10 also comprises a communication device 60 operatively coupled to the processor 50 that is adapted to transmit the processed flow signal and the processed positioning signal from the portable water meter 20 via a communication medium 70. As one will appreciate, the communication medium 70 operatively couples the portable water meter 20 and a remote server 2. In one exemplary use, the determined geographic location coordinate data and the water discharge/flow rate data can be supplied to the remote server 2 via the communication medium to determine the specific location of the particular portable water meter and associate the water discharge with a particular fire hydrant that is connected to the portable water meter. In this aspect, the geographic coordinate position of each fire hydrant within a particular water utility's supply grids are predetermined prior to the use of the portable water meters of the present invention.

The portable water meter apparatus 20 can also have a portable water meter identification information is stored therein the data storage device 52 of the processor. In use, the communication device 60 transmits the stored water meter identification information from the portable water meter 20 via the communication medium 70.

The portable water meter 20 can also comprise a substantially enclosed second housing 23 mounted thereon a portion of the first housing 22. In this aspect, at least portions of the processor and the satellite positioning system is disposed therein the second housing. In another aspect, at least portions of the communication device are disposed therein the second housing. Further, the portable water meter can also comprise a programming port 25 contained within the second housing. The programming port is coupled to the processor 50 such that programming instructions and recorded information can be communicated to and from the processor from external to the second housing through the programming port.

In another aspect, the portable water meter 20 can also comprise a control valve 80 that is constructed and arranged for mounting in the conduit 28 of the first housing. In one aspect, the control valve 80 is positioned intermediate the flow sensor and the outlet end of the first housing. In one embodiment, the control valve 80 is electrically powered and controlled and is selectively movable between an open position, in which water is allowed to flow out of the outlet end of the first housing, and a closed position, in which water cannot exit the outlet end of the first housing. In one aspect, the control valve 80 is electrically coupled to the processor such that the control valve is responsive to control signals received from the processor to move the control valve between the respective open and the closed positions. In one example, the system 10 comprises a transmitter 3 that is operatively coupled to the remote server 2 to transmit a control signal to the portable water meter 20 via the communication medium 70. In this aspect, the communication device 60 of the portable water meter can further comprises a receiver 62 mounted to the portable water meter 20 to receive the control signal from the server via the communication medium 70.

Further, the portable water meter 20 can also comprise a strainer 84 disposed therein the conduit 28 of the first housing. In one aspect the strainer is positioned intermediate the inlet end 24 of the first housing and the flow sensor 30 to protect the downstream flow sensor from damage. The strainer 84 can, for example, be formed of a rigid polymer or metal, such as, for example, stainless steel. The strainer 84 can be compression fit or can be mounted therebetween opposed flanges of the first housing.

A power source 90, such as, for example, one or more batteries, is also mounted therein the first housing 22 of the portable water meter 20 to supply power to the processor 50, the satellite positioning system 40, the communication device 60, as well as, if required, the flow sensor 30. The power source can also be coupled to the control valve 80.

In some embodiments, the portable water meters 20 are capable of bi-directional, real-time communication within the commodity meter system 10. For example, each portable water meter can be equipped with one or more communication ports enabling such communications (such as USB, Ethernet, or other types of communications ports). As described above, each portable water meter 20 can be equipped with a communication device 60, such as, for example, a transceiver 66. The communication device 60 can be any conventional communication device capable of providing or transmitting one or more signals by a wire or wireless connection or otherwise capable of sending signals to the communication medium 70.

Communication with a server 2 or remote computer 4 can be via any conventional telecommunication medium, such as by an Ethernet connection, by a coaxial cable connection, or in by any other telecommunications lines or wireless transmissions. The communication device 60 could be, for example, hardware connected to a port of the portable water meter or a wireless transmitter device connected to the portable water meter. However, in other embodiments described in greater detail below, the portable water meters 20 are capable of communication that is not bi-directional or real-time. In such cases, the portable water meters could be equipped with only one of a transmitter 64 or a receiver 62.

As noted above, the processor 50 of each portable water meter 20 is preferably capable of storing at least some of the outputs of the flow sensors and/or satellite positioning system connected thereto in the data storage device. In this regard, the processor can include a real-time clock and are capable of transmitting the output of the portable water meter via the communication device in real-time. In some embodiments, the processor 50 includes a memory, i.e., the data storage device 52, and is capable of storing the output of the flow sensor and/or satellite positioning system for a period of time (e.g., an extended period of time such as 1 day of 15 or 30 minute interval readings) before transmitting the output to the server 2 or remote computer 4. Also in some embodiments, the processor 50 can convert analog or digital pulses or signals generated the flow sensor into digital signals suitable for transmission to the server 2 or remote computer 4 by any of the communications connections described above.

As noted above, the portable water meter 20 of the present invention is capable of direct communication with one or more servers 2 or remote computers 4. For example, the portable water meters can be Internet-protocol (IP) revenue meters that are capable of direct communication with networks using Internet protocol. Still other manners of connection and communication to servers and/or remote computers are possible, each of which fall within the spirit and scope of the present invention.

Each portable water meter 20 preferably operates according to one or more internal settings or configuration parameters. The configuration parameters can include any internal settings or parameters that control the operation of the portable water meter. Because configuration parameters can exist in a portable water meter in a number of different formats (e.g., digital, analog, etc.) and can be changed in an number of different manners, the term "configuration parameters" as used herein also includes any signal representative of a setting of the portable water meter or capable of controlling the operation of the portable water meter. For example, rather than transmitting an analog setting through the system 10, the analog setting can be converted into a digital signal that represents the analog setting of the configuration parameter. As another example, a configuration setting can be a trigger, an indicator, and the like, transmitted to change an internal setting of the portable water meter. Several configuration parameters may be required to be set for the portable water meter 20 in order to accurately measure the amount of the water commodity being consumed.

In one aspect, as described generally above, conventional water meters use measuring devices such as rotors and/or drums to convert the flow of water therethrough the water meter into a signal that is then converted back into a water consumption value. As one skilled in the art will appreciate, scale factors, which are known properties of the particular water meter, can be used to convert the signals into actual consumption values. The scale factors are properties of the particular water measuring devices.

In some preferred embodiments of the present invention, each portable water meter is connected via one or more communication mediums 70 to a network 8 connected to one or more servers 2. By way of example only and not meant to be limiting, the meter system 10 can have a network 8 to which the portable water meters 20 and the servers 2 and/or remote computers 4 are connected. Each portable water meter 20 is connected to the network 8 via a communication medium 70. In some cases, one or more of the portable water meters can be connected in this manner via more than one communication medium to provide redundancy in the event that one communication medium is temporarily unable to communicate with the network 8. Referring again to the exemplary embodiment, the communication mediums 70 can be separate devices, systems, or networks or can be integral with the network 8.

In some embodiments, each server 2 is equipped with a communication device 3, such as, for example, a transmitter, a receiver, and/or a transceiver. The communication device 3 can be any conventional device capable of providing or transmitting one or more signals via the communication mediums 70. The communication device 3 could be, for example, hardware connected to a port of the server 2 or a wireless transmitter device connected to the server 2. However, in other embodiments described in greater detail below, each server 2 is capable of communication that is not bi-directional or real-time. In such cases, each server 2 could be equipped with a communication device comprising only one of a transmitter or a receiver.

The communication mediums 70 can be any suitable communication system, device, or network. For example, the communication mediums 70 can include a packet-switched network, an Ethernet connection, a serial-communications network, a cellular network, a two-way pager network, a satellite network, and/or a telephone network, and any combination thereof. Still other types of communication mediums 70 are possible and fall within the spirit and scope of the present invention. The network 8 can be any packet-switched network (i.e., the Internet or an intranet), a local-area network (LAN), a wide-area network (WAN), a virtual private network (VPN), or any combination thereof.

In one aspect, the portable water meters 20 can also or instead be connected to the network 8 or directly to one or more servers 2 or remote computers 4 via a cellular network. The portable water meters can be connected to the cellular network via cellular-digital-packet-data (CDPD) modems or other conventional hardware enabling communication via a cellular network. In some preferred embodiments, each portable water meter 20 using the cellular network is equipped with or connected to the cellular network by a CDPD modem.

The portable water meters 20 can also or instead be connected to the network 8 or directly to one or more servers 2 or remote computers 4 via a two-way pager network. The portable water meters 20 can be connected to the two-way pager network via pager circuitry. In some embodiments, each portable water meter using the two-way pager network is equipped with or is connected to the two-way pager network by such pager circuitry. Preferably, the two-way pager network utilizes a telecommunications company's pager network to send and/or receive information regarding the portable water meters. In some embodiments, the servers 2 or remote computers 4 in turn can communicate with the telecommunications company's network infrastructure to bridge onto the two-way pager network.

The portable water meters 20 can also or instead be connected to the network 8 or directly to one or more servers 2 or remote computers 4 via a satellite network. In some embodiments, the satellite network is comprised of one or more low-earth-orbit (LEO) satellite networks. The portable water meters can be connected to the satellite network via satellite communications circuitry. In some embodiments, each portable water meter using the satellite network is equipped with or is connected to the satellite network by such satellite communications circuitry.

The portable water meters can also or instead be connected to the network 8 or directly to one or more servers 2 or remote computers 4 via a telephone network. The portable water meters can be connected to the telephone network in any conventional manner, such as by suitable wireless internal or external modems connected to the portable water meters 20. Thus, in some embodiments, each portable water meter using the telephone network is preferably equipped with or is connected to the telephone network by a modem. In this aspect, the modems use telephone lines to communicate with the network 8, servers 2, and/or remote computers 4.

Any manner of conventional telephone connection can be employed for this purpose. For example, the modems can communicate with the network 8 by contacting an Internet service provider (ISP) and bridging onto a LAN or WAN connected to the network 8, servers 2, or remote computers 4. As another example, the modems can communicate directly with one or more servers or remote computers by communicating with a modem bank connected to the servers 2 or remote computers 4.

Preferably, for each of the communication mediums 70, the devices connected to the network 8 (e.g., communication cards in the portable water meters, circuitry connected to the portable water meters, communications-equipped portable water meters, etc.) are programmed with communications parameters. These communications parameters would be understood by one of ordinary skill in the art, and can include Internet protocol addresses, phone numbers, serial numbers, etc. These communications parameters server to bridge the portable water meters 20 onto communications networks so that the servers 2 (or any other device or computer connected to the network 8) can locate and access the portable water meters.

In some embodiments of the present invention, a database 9 is connected to the network 8 or is connected to one or more of the servers 2 or remote computers 4 in any other manner. The database 9 can store information regarding the operation of each portable water meter 20, the geographical coordinate location of each portable water meter, the identity of each portable water meter, any other necessary information regarding each portable water meter, and/or the geographical coordinate location of each fire hydrant in the service grids of one or more water utilities. Alternatively, such information regarding only some of the portable water meters and/or utility fire hydrants can be stored on the database 9. Preferably, the servers 2 or remote computers 4 communicate with the database 9 in order to access the information regarding the portable water meters 20 and the fire hydrants.

The database 9 is preferably also used to store one or more default configuration parameters for some or all of the portable water meters 20. The default configuration parameters can be any suitable configuration parameter for a portable water meter. In one aspect, the default configuration parameters are the configuration parameters initially programmed into the portable water meter or otherwise set for the portable water meter, either when the portable water meter is first used or when the portable water meter is programmed or otherwise set for the particular consumer or manner of operation. The default configuration parameters can include configuration parameters necessary for the proper operation of the portable water meter 20, such as for example, a self-check of the operative elements of the portable water meter, and can also or instead include configuration parameters agreed upon by the consumer, such as time-of-use or quantity used schedules. The database 9 can also be used to store one or more actual configuration parameters for one or more of the portable water meters 20, and the manner in which this information can be obtained and stored in the database 9 is described in greater detail below.

As described above, one of more computers 4 are preferably connected to the network 8. The computers 4 can be computers or computer systems of the water utility providing the water measured by the portable water meters 20 attached thereto the fire hydrants within the water utility. In this regard, the computers 4 can also include computers and computer systems of individual water utility clients or groups of water utility clients. The water utilities and/or water utility clients are preferably able to communicate with the servers 2 and the database 9 in order to access information regarding operation of the portable water meters 20, portable water meter default configuration parameters, portable water meter actual configuration parameters, and any other necessary information regarding the portable water meters. Any or all of these types of information can be accessible to the water utilities and/or water utility clients.

For example, the water utility clients are preferably able to access information regarding particular portable water meters 20 that are being used in a particular water utility's supply grid. Rather than (or in addition to) client computers 4 being directly connected to the network 8, the meter system 10 can generate and send reports of fire hydrant water consumption (or any other information derived from the portable water meters 20) to the water utility clients. As other examples, a water utility can access a history of water use by a particular client associated with one or more of the portable water meters 20 and stored in the database. Preferably, the present invention enables a user (such as a water utility client or a system administrator not employed by the water utility) of the system 10 to access the database via a computer 4 or server 2 to review the billable water use from one or more fire hydrants as detected by the one or more portable water meters 20 in the system 10. In alternative embodiments of the present invention, the database 9 is associated with a computer 4 of a water utility or with a computer 4 of a water utility client, such as in the case of a memory of either computer.

In some embodiments, the system 10 is configured for use by one water utility client, such as a single water utility, and only portable water meters 20 are managed. In other embodiments, the water meter system 10 is used to manage several different types of water meters for one or more water utility clients. For example, the commodity meter management system 10 can be used to manage both portable and fixed water meters for one or more water utility clients in order to manage all of the public water utility meters for a given geographic area or for a given consumer or group of consumers.

A communications application preferably comprised of software is stored and executed from one or more of the servers 2 (which can be a server of the utility or commodity supplier, a server of the customer, or a server of a third party). Alternatively, the communications application can be stored and executed from one or more of the remote computers 4. In general, the software could be stored and executed from any one of the portable water meters 20, the network 8, the server(s) 2, the remote computers 4, or on any combination of these devices and systems. Although the communications application is described as being comprised of software, the communications application can also be comprised of hardware or a combination of software and hardware.

The communications application software is preferably programmed to operate according to the method of the invention as described below. In one aspect, the meter system 10 can be operated according to a "pull" software architecture in which one or more of the servers 2 or remote computers 4 request information from the portable water meters 20. For ease of description, only a system in which one or more servers 2 perform meter information gathering will be described below, it being understood that similar methods can be performed in the case of one or more remote computers 4 performing the tasks of the servers 2 described below. According to the "pull" software architecture, the server 2 preferably initiates communication with the portable water meter 20 by requesting information from the portable water meter 20 at predetermined intervals, such as every 5 or 10 minutes, every 20 minute, every hour, once every day, and the like. However, the server can also request information from the portable water meter whenever necessary, such as at scheduled times or dates, when a water utility client expects the portable water meter to be in use.

In this aspect, the server 2 preferably requests from the portable water meter one or more actual configuration parameters under which the portable water meter 20 is currently operating. The portable water meter preferably sends the actual configuration parameters to the server 2 via one or more of the communication mediums 70 and the network 8 (in embodiments of the present invention employing a network). Preferably, the server 2 downloads one or more default configuration parameters for the portable water meter 20 from the database 9. The communications application software then preferably compares one or more of the actual configuration parameters to one or more of the corresponding default configuration parameters for the portable water meter. In some preferred embodiments, the communications application software performs this comparison in real-time as the actual configuration parameters are sent by the portable water meter.

If the actual configuration parameters are not equal to, substantially equal to, or within a predetermined threshold of the default configuration parameters, the communications application software preferably indicates that water is being passed therethrough the portable water meter. When a use event is indicated, the communications application software preferably records information regarding the use, such as the date, time, quantity or flow rate of water used, and geographic location of the portable water meter. This information is preferably recorded in the database 9, but could instead or in addition be recorded in a memory associated with any one or more of the servers 2 or remote computers 4. In some preferred embodiments, the communications application software is capable of recording the specific geographic location and/or identity of the portable water meter 20 that is being used so that the portable water meter can be associated with one particular fire hydrant of a water utility at the time of the use event. In use, the information containing the geographic coordinates of each fire hydrant in the water utilities supply grids is preferably recorded in the database 9, but could instead or in addition be recorded in a memory associated with any one or more of the servers 2 or remote computers 4.

In some embodiments of the present invention, the communications application software can take other corrective action instead of or in addition to preparing, displaying and/or sending a use event message. In some embodiments, the communications application software is capable of resetting the portable water meter 20. In one aspect, the portable water meter can be remotely shut down after a predetermined quantity of water flows thru the water meter. In another aspect, the portable water meter can be instructed to prohibit flow therethrough the portable fire hydrant if, for example, the user does not have authorization to use the particular fire hydrant that the portable water meter is attached thereto, or if the internal self-check of the portable water meter indicates that at least one fault exists within the portable water meter. Here, the communications application software preferably sends one or more control signals to the portable water meter instructing the control valve of the portable water meter to open and/or close, or to trigger a reset function in the portable water meter in order to restore default configuration parameter (s) stored in a memory of the portable water meter. As one will appreciate, in various embodiments of the present invention, any one or more configuration parameters of the portable water meter 20, such as, for example and not meant to be limiting, the opening and closing of the water flow control valve, can be controlled and adjusted remotely in this manner.

Also in some embodiments, the communications application software preferably records the time and/or date when the portable water meter 20 has been reset for billing purposes or for any other purpose. This information can be recorded in the database 9 or in a memory associated with a server 2, a remote computer 4, or even the portable water meter. The communications application software preferably waits for a time period corresponding to a predetermined interval before requesting the actual configuration parameters from the portable water meter 20 again, or waits for a scheduled time or command from a user for the same purpose.

Some embodiments of the commodity meter system 10 according to the present invention are operated according to a "push" software architecture in which the portable water meters 20 provide information to one or more servers 2 or remote computers 4, without the servers or remote computers having to request the information. For ease of description, only a system in which one or more servers 2 respond to information provided by a portable meter will be described below, it being understood that similar methods can be performed in the case of one or more remote computers 4 responding in such manners. According to the "push" software architecture, the portable water meter 20 preferably initiates communication with the server 2 by automatically providing information to the server 2 at predetermined intervals, such as every 5 or 10 minutes, every 20 minutes, one an hour, once every day, and the like. Alternatively, the portable water meter 20 can initiate such communication at set times and dates, and/or when a meter configuration parameter has been changed by use.

In this aspect, the portable water meter 20 preferably sends one or more actual configuration parameters to the server 2 via one or more of the communication mediums 70 and the network 8 (in embodiments of the present invention employing a network 8). Alternatively, the portable water meter can send the actual configuration parameters to the network 8 directly or even to the server 2 directly. Preferably, the server 2 downloads one or more default configuration parameters for the portable water meter 20 from the database 9. The communications application software then preferably compares one or more of the actual configuration parameters to one or more of the corresponding default configuration parameters for the portable water meter 20. In some preferred embodiments, the communications application software performs the comparison in real-time as the actual configuration parameters are sent by the portable water meter. As noted above, if the actual configuration parameters are not equal to, substantially equal to, or within a predetermined threshold of the default configuration parameters, the communications application software indicates that a use event has occurred.

In some embodiments of the present invention, the commodity meter management system 10 can also operate according to both the "pull" and "push" software architectures described above. Regardless of whether the "pull" and/or "push" software architectures are used, the meter system 10 in some or the aspects of the present invention is capable of bi-directional real-time communication via each of the communication mediums 70 simultaneously.

It should also be understood that non-bi-directional embodiments of the commodity meter management system 10 are possible. For example, the portable water meters 20 could automatically send the actual use data to the servers 2 without being prompted (i.e., one-directional communication from the portable water meters 20 to the servers 2).

It will be appreciated by those of ordinary skill in the art that the method of the present invention can involve processes or functions which operate simultaneously in some instances, consecutively in some instances, and repetitively in some instances. In other words, various aspects of the present invention can operate independently from one another, as well as in reaction to changing characteristics associated with the meter system 10. As a result, no one flow chart moving from a single beginning point to a single end point can completely define the scope of the present invention.

It should be noted that as used in the appended claims, the term "server" is intended to encompass computers and computer systems that are either stand-alone (i.e., the remote computer 4) or are used to serve other computers (i.e., the server 2).

It will be apparent to those skilled in the art that various modifications and variations can be made in the present invention without departing from the scope or spirit of the invention. Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A meter system for collecting and communicating flow data for water from a fire hydrant having a discharge nozzle, the system comprising:
   a portable water meter releaseably mountable on the discharge nozzle of the fire hydrant;
   a flow sensor configured to output a flow signal representative of the water flow rate passing therethrough the portable water meter;
   a satellite positioning system;
   a processor configured to receive the flow signal output by the flow sensor, process the flow signal to adapt the flow signal for transmission, store the processed flow signal in a data storage device, receive satellite position determining signals output by the satellite positioning system, process the satellite position determining signals to adapt the satellite position determining signals for transmission, and store the processed positioning signal in the data storage device; and
   a communication device configured to transmit the processed flow signal and the processed positioning signal from the water meter via a communication medium.

2. The meter system of claim 1, wherein the water meter has a first housing, further comprising a substantially enclosed second housing mounted thereon on the first housing, and wherein at least portions of the processor and the satellite positioning system is disposed therein the second housing.

3. The meter system of claim 2, wherein at least portions of the communication device are disposed therein the second housing.

4. The meter system of claim 2, further comprising a programming port contained within the second housing and coupled to the processor such that programming instructions and recorded information can be communicated to and from the processor from external to the second housing through the programming port.

5. The meter system of claim 1, further comprising a server located remotely from the portable water meter.

6. The meter system of claim 5, wherein the communication medium operatively couples the portable water meter and to the server.

7. The meter system of claim 6, wherein the communication medium is at least one of a packet-switched network, a serial communications network, a cellular digital data modem network, a two-way pager network, a satellite network, and a wide area network.

8. The meter system of claim 6, wherein the communication device comprises a transmitter mounted to the portable water meter to transmit the processed signal data via the communication medium; and wherein the server comprises a receiver operatively coupled to the server to receive the processed signal data via the communication medium.

9. The meter system of claim 8, wherein the portable water meter comprises a first housing having an inlet end, an opposed outlet end, and defining a conduit extending between the respective inlet and outlet ends.

10. The meter system of claim 9, further comprising a control valve constructed and arranged for mounting in the conduit of the first housing, the control valve selectively movable between an open position, in which water is allowed to flow out of the outlet end of the first housing, and a closed position, in which water cannot exit the outlet end of the first housing.

11. The meter system of claim 10, wherein the control valve is electrically coupled to the processor, and wherein the control valve is responsive to control signals received from the processor to move the control valve between the open position and the closed position.

12. The meter system of claim 11, further comprising a transmitter operatively coupled to the server to transmit a control signal to the portable water meter via the communication medium; and wherein the communication device further comprises a receiver mounted to the portable water meter to receive the control signal from the server via the communication medium.

13. The meter system of claim 12, wherein the transmitter and receiver mounted to the portable water meter comprise a transceiver device.

14. The meter system of claim 10, wherein the control valve is positioned intermediate the flow sensor and the outlet end of the first housing.

15. The meter system of claim 9, further comprising a strainer, wherein the strainer is disposed therein the conduit intermediate the inlet end of the first housing and the flow sensor.

16. The meter system of claim 9, wherein the flow sensor comprises a magnetic rotation sensor to detect water flow therethrough the first housing.

17. The meter system of claim 5, wherein the server comprises a database, wherein the database comprises the predetermined geographical location of each fire hydrant for a utility service area.

18. The meter system of claim 1, wherein a portable water meter identification information is stored therein the data storage device, and wherein the communication device transmits the stored water meter identification information from the portable water meter via the communication medium.

19. The meter system of claim 1, wherein the satellite positioning system comprises a receiver adapted to receive satellite position determining signals.

20. A portable meter apparatus for a fire hydrant having a discharge nozzle, the apparatus comprising:
- a housing releaseably mountable on a discharge nozzle of a fire hydrant, the housing having an inlet end, an outlet end, and defining a conduit extending therebetween the inlet and outlet ends;
- a means for determining the flow rate therethrough the conduit;
- a means for determining the geographic coordinate location information of the housing;
- a processor coupled to the means for determining the flow rate and the means for determining the geographic coordinate location information; and
- a means for transmitting, coupled to the processor, the flow rate signal and the geographic coordinate location of the housing remotely from the housing.

21. A meter system for a fire hydrant having a discharge nozzle, the system comprising:
a) a server system;
b) a portable meter apparatus, comprising:
  i) a housing mountable on a discharge nozzle of a fire hydrant;
  ii) a flow sensor configured to output a flow rate signal representative of a flow rate therethrough the housing of the portable meter apparatus;
  iii) a processor adapted to receive and store the flow signal output by the flow sensor;
  iv) a satellite positioning system, wherein the processor is adapted to receive satellite position determining signals, process the satellite position determining signals to adapt the satellite position determining signals for transmission, and store the processed position determining signals; and
  v) a communication device operatively coupled to the processor that is adapted to transmit the flow signal and processed positioning signal to the server system via a communication medium.

22. The meter system of claim 21, wherein the server system comprises:
  i) a server receiver;
  ii) a server transmitter; and
  iii) a server computer coupled to the server receiver and the server transmitter.

23. The meter system of claim 21, wherein the housing has an inlet end, an outlet end, and defines a conduit extending therebetween the inlet and outlet ends.

24. The meter system of claim 21, wherein the processor is positioned onto a portion of an exterior of the housing.

25. The meter system of claim 21, wherein the satellite positioning system comprises a receiver adapted to receive satellite position determining signals.

26. The meter system of claim 21, wherein the satellite positioning system is positioned onto a portion of the exterior of the housing.

* * * * *